United States Patent [19]

Lyshkow et al.

[11] 4,201,551

[45] May 6, 1980

[54] EMBRITTLEMENT ADDITIVE FOR TREATING ORGANIC MATERIALS

[75] Inventors: Norman A. Lyshkow, Brooklyn, N.Y.; David F. Lewis, Monroe, Conn.

[73] Assignee: Combustion Equipment Associates, Inc., New York, N.Y.

[21] Appl. No.: 19,030

[22] Filed: Mar. 9, 1979

[51] Int. Cl.[2] .......................... C10L 9/02; C10L 5/00

[52] U.S. Cl. ...................................... 44/1 D; 44/1 R; 44/1 E

[58] Field of Search .......................... 44/1 D, 1 R, 1E

[56] References Cited

U.S. PATENT DOCUMENTS

| | | | |
|---|---|---|---|
| 3,961,913 | 6/1976 | Brenneman et al. | 44/1 D |
| 4,008,053 | 2/1977 | Brenneman et al. | 44/1 D |

*Primary Examiner*—Carl F. Dees

*Attorney, Agent, or Firm*—Blum, Kaplan, Friedman, Silberman & Beran

[57] ABSTRACT

In a process for treating the organic fraction of solid waste and cellulosic material with acid to form an embrittled material reducible to a powdered material, increased embrittlement and grinding efficiency are obtained by including an embrittlement additive with the acid. The embrittlement additive is a quaternary ammonium compound. Increased efficiency is evidenced by a decrease in embrittlement temperature and an increase in the amount of embrittled material which will pass through a 40 mesh screen after grinding. The resulting product has a wide variety of uses including as a fuel, a fuel in combination with other fuels, as a building material and as a chemical feed stock, among other things.

29 Claims, No Drawings

EMBRITTLEMENT ADDITIVE FOR TREATING ORGANIC MATERIALS

BACKGROUND OF THE INVENTION

This invention relates generally to a process for converting organic material into a usable embrittled material and more particularly to a process for increasing embrittlement efficiency and reducing the energy required to grind the embrittled material to a finely divided form.

Conservation of natural fuel resources and the disposal of organic solid waste materials have become increasingly severe problems in view of increasing population. Disposal is a significant problem in urban and suburban areas and in the increasing number of industries generating solid organic waste. The large fraction of these organic wastes are combustible and is made up of such materials as paper, textiles, leather, rubber, yard waste, wood waste and bark, garbage and various forms of plastics. One embodiment of the process of the invention is directed to the conversion of these combustible materials making up the organic fraction of solid wastes into a finely divided product which is currently being used as a fuel or fuel supplement.

In U.S. Pat. Nos. 3,961,913 for Process For Treating Organic Wastes And Products Thereof and U.S. Pat. No. 4,008,053 for Process for Treating Organic Wastes, both in the names of Richard S. Brenneman and John J. Clancy and assigned to the same assignee as this application, there is described and claimed a process which makes it possible to treat the organic fraction of solid waste and cellulosic material to form a finely divided, relatively dense fuel material or fuel supplement using a relatively small amount of energy. The resulting product is a finely divided material usable as a fuel or fuel supplement in existing combustion equipment without requiring substantial modification. This product retains essentially all of the dry weight and caloric content of the original waste material from which it is formed. The specification of each of these issued patents is incorporated herein by reference.

In the process described in these issued patents, the material to be embrittled is treated with one or more mineral acids and heated to an elevated temperature under conditions to form an embrittled material. This embrittled material is readily reducible to a finely divided form, without effecting any substantial pyrolysis, decomposition or loss in dry weight of the organic waste. The process may also include the steps of separating organic and inorganic fractions, of primary gross size reduction and predrying before embrittlement and grinding, separating the fuel product from inorganics, pelletizing and mixing with other fuels subsequent to embrittlement.

Embrittlement occurs by treating the organic fraction of solid waste or cellulosic material with acid. The embrittled material is then subjected to a grinding step using, for example, a tumbling device such as a ball mill. Since the organic material is embrittled, relatively less energy is required for grinding than grinding an untreated solid organic fraction of waste or cellulosic material to the same degree of fineness. This factor is one of the principal energy conserving aspects of the process of the patented inventions. Further reduction of this energy required for grinding the embrittled material would make the processes of these patents even more attractive from both an economical and ecological point of view. In addition, any reduction in the temperatures required for the embrittlement would also increase the attractiveness of the embrittlement process. Accordingly, it is desirable to provide an embrittlement process which provides an improved degree of embrittlement, increased grinding efficiency and allows a reduction in embrittlement temperature in the above-described process for treating the organic fraction of solid wastes and cellulosic material.

SUMMARY OF THE INVENTION

Generally speaking, in accordance with the invention, an improved degree of embrittlement of the organic fraction of solid wastes and cellulosic material is obtained by treating the organic material with acid in the presence of a quaternary ammonium compound under conditions to form an embrittled material which is readily reducible to a finely divided form without effecting any substantial pyrolysis, decomposition or loss in dry weight of the organic waste. The quaternary compound is added to the embrittlement step, prior to, simultaneously with, or after the acid in quantities so that the active concentration ranges from about 0.000015 to 0.2 weight percent, based on the weight of organic material to be treated. The quaternary ammonium compound may be added to the embrittlement step in aqueous form when an aqueous solution of acid is used or it may be sprayed onto the material when using a volatile acid. The quaternary compounds are substituted quaternary salts, preferably alkyl substituted having at least one long-chain fatty acid radical.

When the starting material is a solid waste, the process may also include the steps of separating organic and inorganic fractions, primary gross size reduction and predrying before embrittlement and grinding, separating the fuel product from inorganics, pelletizing and mixing with other fuels subsequent to embrittlement. The resulting product is characterized as being a powdered cellulosic material in embrittled form with a caloric value and as having substantially the same weight on a dry basis and a much greater bulk density than the material from which it was formed.

Inclusion of the quaternary ammonium compound with the acid during embrittlement results in an increased degree of embrittlement at reduced temperature than is possible without the quaternary compound. Reduced grinding temperatures and a significant increase in the amount of embrittled material which is reduced to a finely divided form are also obtained. The resultant product is further characterized as being suitable for use as a fuel in this finely divided form or pelletized form or when mixed with other fuels in different forms. Additionally, the product may be used as a building material and a chemical feed stock. The full range of uses are presently unknown.

Accordingly, it is an object of this invention to provide an improved process for the embrittlement of the organic fraction of solid waste and cellulosic material to form an embrittled material.

A further object of the invention is to provide an improved process for embrittling the organic fraction of solid waste and cellulosic material by increasing the degree of embrittlement.

Still another object of the invention is to provide an improved process for the embrittlement of the organic fraction of solid waste and cellulosic material which provides an embrittled material at lower embrittlement temperatures.

Still a further object of the invention is to provide an improved process for the embrittlement of the organic fraction of solid waste and cellulosic material which yields an embrittled material reducible more efficiently to a finely divided form.

Yet a further objection of the invention is to provide an improved process for preparing an embrittled material which may be finely divided at reduced temperatures.

Still other objects and advantages of the invention will in part be obvious and will in part be apparent from the specification.

The invention accordingly comprises the several steps and the relation of one or more of such steps with respect to each of the others, and the relation of constituents, which will be exemplified in the following detailed disclosure and the method, and the scope of the invention will be indicated in the claims.

DESCRIPTION OF THE PREFERRED EMBODIMENTS

The embrittlement additive utilized in the invention for assisting in the embrittlement of the organic material is a quaternary ammonium compound. The quaternary compound is truly a catalyst in the embrittlement with acid. By including the quaternary compound in the embrittlement reagent, the embrittlement temperature may be reduced between about 50° and 100° F. to obtain the same degree of embrittlement that is obtainable by embrittlement with the acid in the absence of the additive. In addition, the embrittled material is more easily reduced to a finely divided form for the same grinding energy input. In this respect almost twice the amount of the finely divided embrittled material prepared in accordance with the invention passes through a 40 mesh screen compared to embrittled material prepared under the same conditions, but without the additive.

The quaternary ammonium compounds utilized in the invention are mono- or diquaternary ammonium salts. The salts are almost always chloride salts and are mono- and dialkyl monoquaternary salts, diquaternary salts with two ammonium groups per molecule and ethoxylated quaternary ammonium salts. The alkyl groups are preferably long-chain groups derived from fatty acids. Generally, the fatty acid source of the long-chain group contain between 8 and 18 carbon atoms in the chain. Typical sources of the groups are tallow, coconut oil, soybean oil and the like.

The quaternary ammonium compound is added to the embrittlement process in the form of an aqueous solution or dispersion at the same time or prior to acid treating. In the case of a non-volatile acid, the additive is preferably added in aqueous form with an aqueous solution of acid or sprayed on the organic material prior to addition of acid. In the case of a volatile acid, the additive may be sprayed on the organic material prior to or simultaneously with the acid.

The preferred monoalkyl and dialkyl quaternary ammonium compounds of the invention have three methyl groups and one long-chain radical derived from fatty acids. The alkyltrimethylammonium chloride salts and the dialkyldimethylammonium chloride salts found particularly useful in the embrittlement have the following general formulas, respectively:

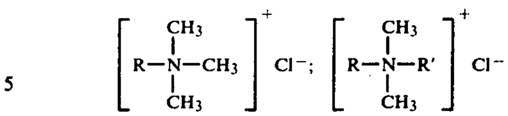

wherein R and R' represent a long-chain hydrocarbon which may contain from 8 to 18 carbon atoms. The quaternary salt can be an alkyldimethylbenzylammonium chloride salt wherein R' is a methylbenzyl radical and R is an alkyl group of 14 to 18 carbon atoms derived from tallow. Several specific examples of the monoalkyl and dialkyl quaternary ammonium compounds are set forth in the examples below.

When the quaternary ammonium compound is an ethoxylated quaternary, such as a methyl(polyoxyethylene) alkylammonium chloride, it has the following general formula:

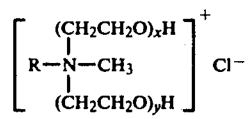

wherein R represents alkyl groups containing 8 to 18 carbon atoms derived from coconut oil or a fatty acid such as oleic acid, and x and y represent the combined ethylene oxide content which may total 2 to 50. In the case where the quaternary ammonium compound is a diquaternary salt with two quaternary ammonium groups per molecule, such as N,N,N',N',N'-pentamethyl-N-tallow -1, 3-propanediammonium dichloride it is characterized by the following structure:

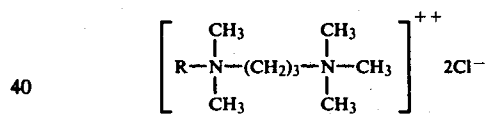

wherein R represents an alkyl group of 14 to 18 carbon atoms derived from tallow.

The precise length and distribution of the long-chain hydrocarbon or fatty acid radicals of the quaternary ammonium compounds vary depending on the particular salt selected and the source of radical. For example, the chain in the dimethyldi(hydrogenated-tallow) ammonium chloride salt is derived from tallow and each chain will have a corresponding number of carbon atoms as are present in the tallow. In the material utilized in the examples below, a typical carbon chain length distribution is about 3% tetradecyl ($C_{14}$), 29% hexadecyl ($C_{16}$) and 67% octadecyl ($C_{18}$). The remaining 1% is octadecenyl and/or octadecadienyl ($C_{18}$ with one or two unsaturated bonds). Of course, the specific distribution of carbon chain length depends on the particular tallow used for forming the quaternary salt. A typical tallow may comprise about 2.5-4% chains shorter than $C_{16}$, 27-33% $C_{16}$, 60-68% $C_{18}$ and 1-1.5% greater than $C_{18}$. A hydrogenated tallow may also contain between about 0.5-2% enoic and dienoic material. Similarly, methylbis(2-hydroxyethyl)oleylammonium chloride contains about 4% tetradecyl, 5% hexadecyl, 6% octadecyl and 85% octadecenyl and/or octadecadienyl; and dimethyldicocoammonium chloride contains about 5% octyl, 6% decyl, 51% dodecyl, 19% tetradecyl, 9% hexadecyl, 5% octadecyl and 5% octadecenyl and/or octadecadienyl.

These quaternary ammonium compounds are generally available as solutions in water/isopropanol or water alone and the ethoxylated quaternaries are generally in solution in isopropanol or are solvent free. The compounds are either liquid or can be liquified by slight warming. The exception to this is dimethyldi(hydrogenated-tallow)ammonium chloride, one of the preferred quaternary ammonium compounds. This salt is a soft paste or waxy material with a freezing point of about 95° F. It is essentially insoluble in water, but will form stable dispersions of up to about 7.5% by weight in water under proper conditions. The dialkyl quaternaries are soluble in benzene, chloroform, carbon tetrachloride, methanol and isopropanol, but only slightly soluble in acetone at room temperature with solubility decreasing with an increase in the chain-length of the alkyl groups.

The selected quaternary ammonium compound is preferably added to the embrittlement reagent as an aqueous solution or dispersion. A quantity sufficient to yield a concentration of quaternary ammonium compound of between about 0.000015 to about 0.2 weight percent based on the dry weight of the organic material to be treated is added. That is a weight percentage based on weight of additive per weight of dry material.

The term "organic fraction of solid waste and cellulosic materal" as used herein designates generally the materials which may be used in the process of the invention to form an embrittled product. This term encompasses all materials which are of cellulosic origin and which, when they undergo combustion in the presence of oxygen, produce caloric energy. The term, therefore, includes, but is not limited to, papers, paperboards, textiles, wood, wood wastes including barks, crops, agricultural products and wastes, including bagasse and the like, food wastes, yard wastes and some forms of plastics.

It will be seen from Table 1 that such materials make up the greater part of so-called solid municipal wastes.

TABLE I

| | Composition of a Typical Solid Municipal Waste | |
|---|---|---|
| | % by Weight, Dry Basis | |
| Component | Total Waste | Combustible Organic Fraction |
| Paper & Paperboard | 40.0 | 52.9 |
| Yard Wastes | 12.0 | 15.5 |
| Food Wastes | 9.3 | 12.1 |
| Wood | 8.4 | 10.9 |
| Textiles | 2.5 | 3.2 |
| Plastics | 2.5 | 3.2 |
| Rubber | 1.1 | 1.4 |
| Leather | 0.6 | 0.8 |
| Glass | 10.3 | |
| Metal | 7.1 | |
| Dirt | 5.2 | |

Thus substantially all of the organic material in solid wastes, e.g., in solid municipal wastes, can be subjected to the process of this invention to form an embrittled product.

Such solid wastes typically have a moisture content of about 18%, almost all of which is associated with the organic fraction. The food wastes may contain oleaginous materials in the form of meat fat, oils, etc. The presence of such materials introduces no problems in the process of this invention at the levels at which they normally occur in typical solid municipal wastes. About one-half of the solid organic wastes which can be expected to be available from an urban area comprise paper, and as this paper constituent comprises Kraft paper, newsprint and corrugated board, it is possible to use a mixture of these types of papers as one model for determining the parameters of the embrittling step.

The embrittlement step, as will be described in more detail below, comprises treating the organic fraction of the waste or cellulosic material with acid in the presence of a quaternary ammonium compound in a controlled temperature range for a time sufficient to effect the embrittlement. As noted, when the starting material is a waste product, inorganic material present in the waste may be separated from the organic fraction either prior to or subsequent to the embrittling.

Since embrittlement does not involve any appreciable pyrolysis, thermal degradation or combustion, the conditions under which this step is performed should be such as to prevent such reactions from occurring to any appreciable extent. Thus, it is desirable to complete the embrittlement at elevated temperatures which are as low as possible. Although temperatures may range between 212° and 550° F., it is preferable to use temperatures in the heat treating which range between about 250° and 350° F. Carrying out the embrittlement in the presence of the quaternary ammonium compound permits embrittling at temperatures ranging from about 225° to 300° F.

The use of temperatures not above 350° F. makes it possible to use hot air as the means for heating the material during embrittlement. If temperatures much in excess of 350° F. are used, then care must be taken to use an atmosphere of reduced oxygen content to prevent combustion of the organic material. Thus, for maximum yield, the combination of temperature and oxygen content of the surrounding atmosphere must be such that no significant combustion or pryolysis will occur during embrittlement.

The acid used in the embrittlement step is preferrably a mineral acid (HCl, $H_2SO_4$, $HNO_3$ or $H_3PO_4$), or what may be termed a precursor of a mineral acid. Among the compounds which may be regarded as mineral acid precursors are strongly acid metal salts of a mineral acid, e.g., $ZnCl_2$ or $FeCl_3$ or an inorganic acidic gas, e.g., $SO_3$, $NO_2$ or $N_2O_5$.

The acid portion of the embrittlement reagent may be used in gaseous form (gaseous HCl or $SO_3$, for example) or in liquid form (dilute aqueous solution of $H_2SO_4$ or HCl or alcholic solution of $ZnCl_2$, for example). The use of a volatile acid (e.g., an acid having a boiling point below the temperature used) such as HCl gas may have advantages in a batch process and in those embodiments of the embrittling step where heating precedes acid treating or where heating and embrittlement reactant treating are carried out simultaneously. The use of a nonvolatile acid (i.e., an acid having a boiling point above the temperature used) such as a dilute aqueous solution of $H_2SO_4$ and dispersion of quaternary ammonium compound may have advantages in a continuous process and in that embodiment of the embrittling step where heating follows acid treating. Thus in this latter case, the organic material, after being sprayed with or soaked in the embrittlement reagent, may be pressed to 50 to 70% dryness or otherwise treated to remove at least a portion of the water absorbed in the reagent treatment before heating. Some energy will of course be required in the subsequent drying of the resulting moist material.

When a volatile acid is used and is carried in a treating gas, the amount of residual acid in the final product is not directly related to the concentration of the acid in the treating gas. Therefore, there is a wide latitude possible in the concentration of the volatile acid in the treating gas, and the optimum concentration may readily be determined consonant with such operational parameters as temperatures, time of exposure of the waste to the gas, form of gas-solids contacting, materials from which the treating apparatus is formed and the like. Exemplary of such concentrations is the use of about 0.1 to 5% by volume of HCl in air when paper is treated. Normally, the higher concentrations are preferred since the embrittlement will generally proceed more rapidly.

When a nonvolatile acid is used, e.g., an aqueous solution of $H_2SO_4$, the acid pickup in the organic material depends on the acid concentration and amount of acid solution picked up by the organic material. It is therefore preferable in this embodiment of the embrittling step to use sufficient acid so that the pickup yields acid concentrations between about 0.1 to 5% by weight in the organic material, based on the dry weight of material.

The length of time during which the organic material is exposed to the embrittling step will vary, depending upon the embodiment of this step used, the size of the waste material being treated, and the conditions of treatment, i.e., acid dosage (time and concentration) and temperature. The time must be at least sufficient to bring the material up to a desired temperature when heating and acid treatment are done simultaneously. Generally, this time will not be in excess of about 30 minutes; and if higher temperatures and higher acid concentrations are used, embrittlement may be accomplished in only a few minutes, e.g., about 5 minutes. For any given size of organic material, taken in conjunction with the operational parameters chosen, it is a simple matter to choose an optimum time to give a product having a desired proportion of embrittled, friable product. Thus, it may be desirable to carry out embrittlement until only a predetermined fraction of the material being processed has reached the desired stage of embrittlement and to recycle that fraction which has not.

Some of the components making up the organic material to be treated have water associated with them. This water may be chemically bonded or mechanically held within the organic mass and its content in the embrittled material resulting from the combined heat and acid treating should not exceed about 10% by weight and preferably the embrittled product should be as dry as possible for ease of grinding.

The use of flue or stack gases as a means for directly heating the material during embrittlement introduces the possibility of introducing steam (water vapor as contrasted to water associated with the organic waste material) into the embrittling step. It has been found that the presence of such steam does not materially affect the embrittlement of the organic material.

Embrittlement may be carried out in one of several ways. If heating and embrittlement reagent treating are to be done separately, then heating may be accomplished in such equipment as a cocurrent or countercurrent direct or indirect fired dryer, a fluid bed, a multiple hearth roaster, a multideck digester or the like. If a volatile acid is used, such as gaseous HCl, this may be applied in any suitable gas-solid contacting device such as a cocurrent or countercurrent flow mixer to the heated material. If a nonvolatile acid is used, such as an aqueous solution of $H_2SO_4$, the acid and quaternary ammonium compound may be sprayed on as the organic material is moved on a belt conveyor; or it may be applied by moving the waste material through an acid bath, in which case the excess embrittlement reagent may be removed by pressing through rollers or the like.

If heating and reagent treatment with a volatile acid are to be carried out simultaneously, then this combined step may be done in a rotary dryer into which a stream of HCl gas and aqueous dispersion of quaternary ammonium compound are introduced.

It is also possible in some embrittling equipment to apply a degree of attrition sufficient to pulverize or grind the embrittled material. Thus, the step of grinding may be combined with embrittlement using, for example, a tumbling device such as a ball mill. If grinding is to be carried out as a separate step it may be done in apparatus, such as ball mills and pulverizers or between abrasive surfaces. Since the organic material is embrittled, grinding, whether it is carried out separately or as a part of the embrittling step, requires relatively little energy compared with that required for grinding the untreated solid organic waste material to the same degree of fineness. This fact is one of the principal energy conserving aspects of the process of this invention.

The particle size of the embrittled product may vary over a relatively wide size range, depending upon such factors as type and degree of grinding, etc. Generally, the greater portion of the material will pass a 40 mesh screen (i.e., about 0.0165 inch or smaller) and a considerable portion will pass a 200 mesh sieve (i.e., about 0.0029 inch or smaller). The larger particles which may not be completely embrittled may be recycled to the embrittling step.

The product which results from grinding, and classification if required, is a fine powdery material. The product retains essentially all of the dry weight of the original solid organic material from which it was made and has essentially the same carbon/oxygen/hydrogen ratios that were present in the untreated organic materal. Little, if any, caloric value is lost in the embrittlement. The embrittled product when formed by treatment with HCl contains only a small amount of chloride ions, e.g., typically 0.1 to 0.2% by weight, although it may be up to 0.6%. That product formed by using $H_2SO_4$ will contain sulfate ions essentially in direct proportion to the quantity of acid picked up in the treating.

The powdered product may be used as a fuel which may be burned in its finely divided form or may be mixed with gaseous, liquid or solid fuels (referred to hereinafter as primary fuels) to serve as a secondary fuel. Such mixing may be prior to or during combustion. Thus, for example, it may be entrained in natural gas or fed simultaneously with natural gas through separate injection apparatus into a combustion chamber; it may be slurried with fuel oil or cofired therewith; and it may be physically mixed with powdered coal or cofired with it. The product to be used for fuel may also be pelletized, with or without the use of a binder such as water, starch, wax, mineral oil and the like, in standard pelletizing equipment. Finally a fuel product may be compacted under pressure to form a highly dense material.

In addition to use as a fuel material, the powdered product can be used as a building material, such as construction board and caulking materials. It may be used as a chemical feed stock and as an extender for road tar and the like. The full range of uses are as yet not fully known.

The process of the invention will be described in the following examples which are intended to be illustrative and are not presented in a limiting sense. In each example, the particular embrittlement and grinding procedures set forth were followed.

A sufficient quantity of a dispersion of dimethyldi(hydrogenated-tallow)ammonium chloride was formed for the examples by melting the salt at 130° F. and dissolving it in an equal amount by weight of ethanol. The ethanol solution was then poured into water maintained at 140° F. under violent high shear mixing conditions as are obtainable in a blender. A sufficient quantity of the ethanol solution was added to obtain a dispersion of about 4 weight percent dimethyldi(hydrogenated-tallow)ammonium chloride. Thus, the dispersion includes 4% salt, 4% ethanol and 92% water by weight.

In each example reported in the following Tables A and B, a sample of 20 grams of paper was soaked in embrittlement reagent including the acid and a Lewis base of the type indicated. The paper is soaked for a time sufficient to wet the paper completely and is then pressed until the total weight is approximately 40 grams. The embrittlement reagent soaked paper is immediately placed in an oven at 210° F. and 20% relative humidity and allowed to dry for 20 minutes.

The treated paper is cut into strips 1" long by ½" wide and placed in a ball mill with a 2 kilogram charge of ⅜" balls which have been preheated to 257° F. The resulting milled papers and balls are placed on a roller and ground for 10 minutes. Following this, the contents of the mill are placed on a 40 mesh screen and vibrated. The amount of ground embrittled material that passes through the screen is determined together with the amount remaining on the screen. The percent that passes through the 40 mesh screen was calculated and is reported as the Percent Grind, which is defined as follows:

$$\text{Percent Grind} = \frac{\text{weight of paper through 40 mesh}}{\text{weight on 40 mesh} + \text{weight through 40 mesh}} \times 100$$

In the examples reported in Table A, Kraft paper was embrittled with a 0.5% sulfuric acid embrittlement reagent containing an embrittlement additive of the type and in the amount set forth. Table A sets forth the weight percent of the 20 grams of Kraft paper initially treated that passed through a 40 mesh screen after being ball milled at 125° C. for 10 minutes.

TABLE A

Kraft Paper Embrittled with 0.5% $H_2SO_4$ and Ball Milled at 125° C.

| Ex. | Embrittlement Additive | Concentration Additive* | Percent Grind (Through 40 Mesh) |
|---|---|---|---|
| 1 | Tetraethylammonium bromide | 0.1 | 30 |
| 2 | Tetraethylammonium bromide | 0.2 | 30 |
| 3 | Tetraethylammonium bromide | 0.01 | 45 |
| 4 | Tetraethylammonium bromide | 0.001 | 35 |
| 5 | Dimethyldi(hydrogenated-tallow)-ammonium chloride | 0.1** | 32 |
| 6 | Dimethyldi(hydrogenated-tallow)-ammonium chloride | 0.01** | 70 |
| 7 | Dimethyldi(hydrogenated-tallow)-ammonium chloride | 0.001** | 32 |
| 8 | None | — | 34 |
| 9 | Urea | 0.1 | 20 |
| 10 | Urea | 0.2 | 18 |
| 11 | Urea | 0.5 | 14 |

*Based on dry weight of paper.
**Active concentration of the quaternary ammonium chloride is 75 percent In Examples 12–22 reported in Table B, 20 grams of Kraft paper was embrittled with a 0.2% sulfuric acid embrittlement solution.

TABLE B

Kraft Paper Embrittled with 0.2% $H_2SO_4$ and Ball Milled at 125° C.

| Example | Embrittlement Additive | Concentration Additive* | Percent Grind |
|---|---|---|---|
| 12 | Dimethyldi(hydrogenated-tallow)ammonium chloride | 0.1 | 20 |
| 13 | Dimethyldi(hydrogenated-tallow)ammonium chloride | 0.01 | 27 |
| 14 | Dimethyldi(hydrogenated-tallow)ammonium chloride | 0.001 | 39 |
| 15 | Dimethyldi(hydrogenated-tallow)ammonium chloride | 0.0001 | 26 |
| 16 | Dimethylcocoammonium chloride | 0.1 | 5 |
| 17 | Dimethylcocoammonium chloride | 0.01 | 18 |
| 18 | Dimethylcocoammonium chloride | 0.001 | 10 |
| 19 | None | — | 21 |
| 20 | $K_2Cr_2O_7$ | 0.1 | 5 |
| 21 | $K_2Cr_2O_7$ | 0.01 | 18 |
| 22 | $K_2Cr_2O_7$ | 0.001 | 27 |

*Active concentration for the quaternary ammonium chloride is 75% of value listed and is based on dry weight of the paper.

Taking the best results from Tables A and B for each concentration of acid, grinding efficiency was determined at five different temperatures for both Kraft paper (Table C) and newsprint (Table D). In both Tables C and D, the active concentration of the quaternary ammonium compound is 75 percent of the normal concentration which is based on the dry weight of the paper treated.

TABLE C

| Example | Embrittlement Reagent* | 150° C. | 125° C. | 100° C. | 50° C. | 20° C. |
|---|---|---|---|---|---|---|
| | Kraft Paper, Percent Grind Based on Embrittlement Reactants at Different Grinding Temperatures | | | | | |
| | | Grinding Temperature | | | | |
| 23 | 0.5% $H_2SO_4$ 0.01% Dimethyldi (hydrogenated-tallow)ammonium chloride | 72 | 74 | 40 | 26 | 26 |
| 24 | $H_2SO_4$ Dimethyldi (hydrogenated-tallow)ammonium chloride | | 46** | | | |
| 25 | 0.2% $H_2SO_4$ 0.001% Dimethyldi-(hydrogenated-tallow) ammonium chloride | 36 | 39 | 13 | 6 | 13 |
| 26 | 0.2% $H_2SO_4$ | 23 | 21 | 9 | 10 | 9 |
| 27 | 0.5% $H_2SO_4$ | | 34 | | 12 | |

*The active concentration of salt is 75 percent
**Dispersion prepared in water alone

TABLE D

| Example | Embrittlement Reactant* | 150° C. | 125° C. | 100° C. | 50° C. | 20° C. |
|---|---|---|---|---|---|---|
| | Newsprint, Percent Grind Based on Embrittlement Reactants at Different Grinding Temperatures | | | | | |
| 28 | 0.5% $H_2SO_4$ 0.01% Dimethyldi (hydrogenated-tallow) ammonium chloride | 92 | 100 | 59 | 27 | 28 |
| 29 | 0.5% $H_2SO_4$ | 71 | 54 | 37 | 24 | 27 |
| 30 | 0.2% $H_2SO_4$ 0.001% Dimethyldi (hydrogenated-tallow) ammonium chloride | 65 | 40 | 17 | — | — |
| 31 | 0.2% $H_2SO_4$ | 40 | 30 | 28 | 18 | 27 |

*The active concentration of the quaternary salt is 75 percent

Example 8 in Table A and Example 10 in Table B represent the controls as the embrittlement reactant is only an aqueous solution of $H_2SO_4$. In Example 8, wherein the embrittlement reactant is 0.5% $H_2SO_4$, 34% of the embrittled material passed through a 40 mesh screen in comparison to only 21% for Example 19 with an embrittlement reactant of 0.2% $H_2SO_4$. The improvement obtainable with 0.5% $H_2SO_4$ when 0.1% dimethyldi (hydrogenated-tallow) ammonium chloride is added to the embrittlement reactant of Example 8 is illustrated in Example 6 where a percent grind of 70% was obtained. Similar increases in percent grind are obtained by including dimethyldi (hydrogenated-tallow)ammonium chloride in the embrittlement reagent of 0.2% $H_2SO_4$ as shown in the results of Examples 13–15.

In Examples 32–43, a 20 gram sample was soaked in embrittlement reagent of 0.5% sulfuric acid and 0.0075% additive to demonstrate the broad range of effective quaternary ammonium compounds. The procedure followed that of the earlier examples with the soaked paper squeezed between rollers to remove excess reagents and placed in an oven at 200° F. and 20% relative humidity.

The treated paper was cut into strips 1" long by ¼" wide and placed in a ball mill with a 2 kilogram charge of ⅜" steel balls which have been preheated to 257° F. and ground for 10 minutes. The contents of the mill are placed on a 40 mesh screen and vibrated and amounts of embrittled material that pass through the screen are determined together with the amount remaining on the screen.

TABLE E

| Example | Embrittlement Additive | Wet Paper Weight | % Grind |
|---|---|---|---|
| | Kraft Paper Embrittled with 0.5%* $H_2SO_4$ and 0.0075%* Embrittlement Additive and Ball Milled at 125° C. | | |
| 32 | None - Control | 42.2 | 38.7 |
| 33 | Dimethyldi (hydrogenated-tallow) ammonium chloride | 40.0 | 74.2 |
| 34 | Dimethyldicocoammonium chloride | 36.9 | 68.1 |
| 35 | Trimethylcocoammonium chloride | 43.1 | 51.4 |
| 36 | Trimethyltallowammonium chloride | 38.1 | 54.8 |
| 37 | Trimethyldodecylammonium chloride | 41.5 | 47.4 |
| 38 | Trimethylhexadecylammonium chloride | 42.2 | 49.0 |
| 39 | Methylbis (2-hydroxyethyl) oleylammonium chloride | 41.6 | 71.7 |
| 40 | Methylpolyoxyethylene(15) octadecylammonium chloride | 41.3 | 53.6 |

TABLE E-continued

Kraft Paper Embrittled with 0.5%* $H_2SO_4$ and 0.0075%* Embrittlement Additive and Ball Milled at 125° C.

| Example | Embrittlement Additive | Wet Paper Weight | % Grind |
|---|---|---|---|
| 41 | Trimethylsoyaamonium chloride | 41.1 | 60.9 |
| 42 | Trimethyloctadecylammonium chloride | 40.6 | 52.0 |
| 43 | N,N,N',N',N'-Pentamethyl-N-tallow-1,3-propanediammonium dichloride | 38.7 | 55.2 |

*Active concentration of the quaternary ammonium compound, based on dry weight of paper In examples 44–51, HCl was used as the embrittlement acid in combination with the quaternary ammonium compounds noted. The procedures of Examples 32–43 were followed and the three most effective quaternary ammonium compounds reported in Table E were utilized.

TABLE F

| Example | Additive | Active Additive Concentration | Percent Grind |
|---|---|---|---|
| 44 | None | Control | 57.0 |
| 45 | Methylbis(2-hydroxyethyl) oleylammonium chloride | 0.0075 | 69.3 |
| 46 | Dimethyldicocoammonium chloride | 0.0075 | 49.2 |
| 47 | Dimethyldicocoammonium chloride | 0.0037 | 33.5 |
| 48 | Dimethyldicocoammonium chloride | 0.150 | 33.5 |
| 49 | Dimethyldi(hydrogenated-tallow) ammonium chloride | 0.0075 | 52.1 |
| 50 | Methylbis(2-hydroxyethyl) oleylammonium chloride | 0.00375 | 48.6 |
| 51 | Methylbis(2-hydroxyethyl) oleylammonium chloride | 0.015 | 50.3 |

The procedures of Examples 1–42 were followed in Examples 53–67 as reported in Tables F, G and H for an embrittlement reagent of 0.5% $H_2SO_4$ and the embrittlement additive at the various concentrations listed, resulting in the Percent Grinds reported.

TABLE G**

Kraft Paper Embrittled with 0.5%* $H_2SO_4$ and Methylbis(2-hydroxyethyl)oleylammonium chloride and Ball Milled at 125° C.

| Example | % *Additive | % Grind |
|---|---|---|
| 52 | 0.00075 | 60.0 |
| 59 | 0.0046 | 64.0 |
| 54 | 0.0075 | 71.7 |
| 55 | 0.045 | 44.9 |
| 56 | 0.090 | 48.2 |

*Based on Dry Weight of Paper
**See Example 32 for control (38.1% grind)

TABLE H

Kraft paper Embrittled with 0.5%* $H_{2/SO4}$ and Dimethyldi(hydrogenated-tallow) ammonium chloride and Ball Milled at 125° C.

| Example | % *Additive | % Grind |
|---|---|---|
| 57 | 0.00085 | 64.0 |
| 58 | 0.0047 | 58.2 |
| 59 | 0.0080 | 70.9 |
| 60 | 0.051 | 41.6 |

TABLE H-continued

Kraft paper Embrittled with 0.5%* $H_{2/SO4}$ and Dimethyldi(hydrogenated-tallow) ammonium chloride and Ball Milled at 125° C.

| Example | % *Additive | % Grind |
|---|---|---|
| 61 | 0.084 | 40.0 |

*Based on Dry Weight of Paper

TABLE J

Kraft Paper Embrittled with 0.5%* $H_2SO_4$ and Dimethyldicocoammonium chloride and Ball Milled at 125° C.

| Example | % *Additive | % Grind |
|---|---|---|
| 62 | 0.00085 | 53.7 |
| 63 | 0.0034 | 59.9 |
| 64 | 0.0075 | 63.0 |
| 65 | 0.057 | 75.4 |
| 66 | 0.075 | 68.0 |
| 67 | 0.150 | 43.1 |

*Based on Dry Weight of Paper

From the results of Examples 48–58 it is clear that the effective active concentration of embrittlement additive lies in the range from about 0.00075 to about 0.2 weight percent, based on the dry weight of the organic material. In the exemplary embodiments of the invention, the largest Percent Grinds are obtained when the embrittlement reactant is present from about 0.002 to 0.075 weight percent in the presence of about 0.5% $H_2SO_4$. The most preferred concentration between about 0.005 to 0.0075%, based on the dry weight of the organic fraction. Of course, the exact concentration of the embrittlement additive is dependent on the quaternary compound selected with the acid, acid concentration and the type of organic fraction treated.

The improvement in grinding efficiencies illustrated in Tables C and D also shows significant improvement in reduction of grinding temperature for material embrittled with an embrittlement reactant including about 0.5% $H_2SO_4$ and about 0.01% dimethyldi(hydrogenated-tallow)mmonium chloride. In the process of the invention, grinding temperatures may vary from room temperature to about 150° C. The preferred grinding range is between about 100° and 150° C. and most preferably between 125° and 150° C.

The exact mechanism why a quaternary ammonium compound enhances the embrittlement of cellulose material and improves grinding efficiency is not understood fully. However, it is clear that the temperature of the embrittlement reaction may be decreased by between about 25° and 100° F. and significantly increased quantities may be reducible to a finely divided form more efficiently. It is believed that the quaternary ammonium compound acts as a swelling agent for the organic material and penetrates the crystalline structure thereby allowing the acid to function more efficiently. This increase in efficiency is significant in that there is a corresponding reduction in the energy required to carry out the embrittlement step.

A significant process condition observed in performing the above examples is that the quaternary ammonium compound must be mixed in the aqueous phase in a uniform dispersion. It is believed that a uniform dispersion allows the embrittlement additive to penetrate the organic material. For example, when the quaternary ammonium compound was dispersed in water along as in Example 24, grinding efficiency did not increase as significantly as compared to the ethanol based dispersion of the invention.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process for the treatment of the organic fraction of solid waste and cellulosic material to form a powdery material comprising treating the material with acid in the presence of an effective amount of quaternary ammonium compound to form an embrittled material which is readily reducible to finely divided form.

2. The process of claim 1, wherein the treated material is municipal solid waste.

3. The process of claim 1, wherein the treated material is wood, wood products, wood waste or mixtures thereof.

4. The process of claim 1, wherein the treated material is agricultural crops, agricultural products, agricultural wastes or mixtures thereof.

5. The process of claims 1, 2, 3, or 4, wherein said quaternary ammonium compound is a substituted quaternary ammonium compound.

6. The process of claim 5, wherein said substituted quaternary ammonium compound includes at least one long chain hydrocarbon group.

7. The process of claim 6, wherein said long chain hydrocarbon are alkyl groups of from 8 to 18 carbon atoms.

8. The process of claim 7, wherein said quaternary ammonium compound is a chloride salt.

9. The process of claim 6, wherein said alkyl substituted quaternary ammonium compound is a dialkyldimethylammonium chloride.

10. The process of claim 9, wherein said dialkyldimethylammonium chloride is dimethyldi(hydrogenated-tallow)ammonium chloride.

11. The process of claim 10, wherein said dimethyldi(hydrogenated-tallow)ammonium chloride is added as an aqueous disperson.

12. The process of claim 9, wherein said dialkyldimethylammonium chloride is dimethyldicocoammonium chloride.

13. The process of claim 7, wherein said alkyl substituted quaternary ammonium compound is an alkyltrimethylammonium chloride.

14. The process of claim 6, wherein said substituted quaternary ammonium compound is a methyl(polyoxyethylene)alkylammonium chloride.

15. The process of claims 1, 2, 3 or 4, wherein said quaternary ammonium compound is present in an active concentration between about 0.000075 and 0.2 percent, based on the weight of the dry weight of the material to be treated.

16. The process of claim 15, wherein the active concentration of said quaternary ammonium compound is between about 0.000075 and 0.15 weight percent.

17. The process of claim 16, wherein the active concentration of said quaternary ammonium compound is between about 0.005 and 0.1 weight percent.

18. The process of claims 1, 2, 3 or 4, wherein said acid is mineral acid.

19. The process of claim 18, wherein said mineral acid is sulfuric acid.

20. The process of claim 18, wherein said mineral acid is hydrochloric acid.

21. The process of claim 18, wherein said mineral acid is a mixture of at least two mineral acids.

22. The process of claim 19, wherein said quaternary ammonium compound is a dialkyldimethylammonium chloride.

23. A process for the treatment of the organic fraction of solid waste and cellulosic material to form a powdery material comprising treating the material with an embrittlement reagent comprising sulfuric acid and a dialkyldimethylammonium chloride, the acid present in the range between about 0.1 and 5 percent by weight and the dialkyldimethylammonium chloride present in an active concentration range is between about 0.000075 and 0.2 weight percent, the weight percent based on the dry weight of the material to be treated.

24. The process of claim 23, wherein said material to be treated is municipal solid waste.

25. The process of claim 24, wherein said dialkyldimethylammonium chloride is dimethyldi(hydrogenated-tallow)ammonium chloride.

26. The process of claim 25, wherein said quaternary ammonium compound is added in aqueous dispersion.

27. The process of claim 26, including forming the aqueous dispersion by:

melting said dimethyldi(hydrogenated-tallow)ammonium chloride;

dissolving said melted dimethyldi(hydrogenated-tallow)ammonium chloride in ethanol; and dispersing said ethanol solution of said dimethyl(hydrogenated-tallow)ammonium chloride in water under mixing conditions.

28. The process of claim 27, wherein the active concentration of dimethyldi(hydrogenated-tallow)ammonium chloride is between about 0.0005 and 0.01 weight percent.

29. The process of claim 27, wherein the acid concentration is between about 0.1 and 1 weight percent and the active concentration of dimethyldi(hydrogenated-tallow)ammonium chloride is between about 0.0005 and 0.01 weight percent.

* * * * *